April 16, 1946. W. J. BLOOMER 2,398,689
AZEOTROPIC STYRENE DISTILLATION
Filed Aug. 17, 1942
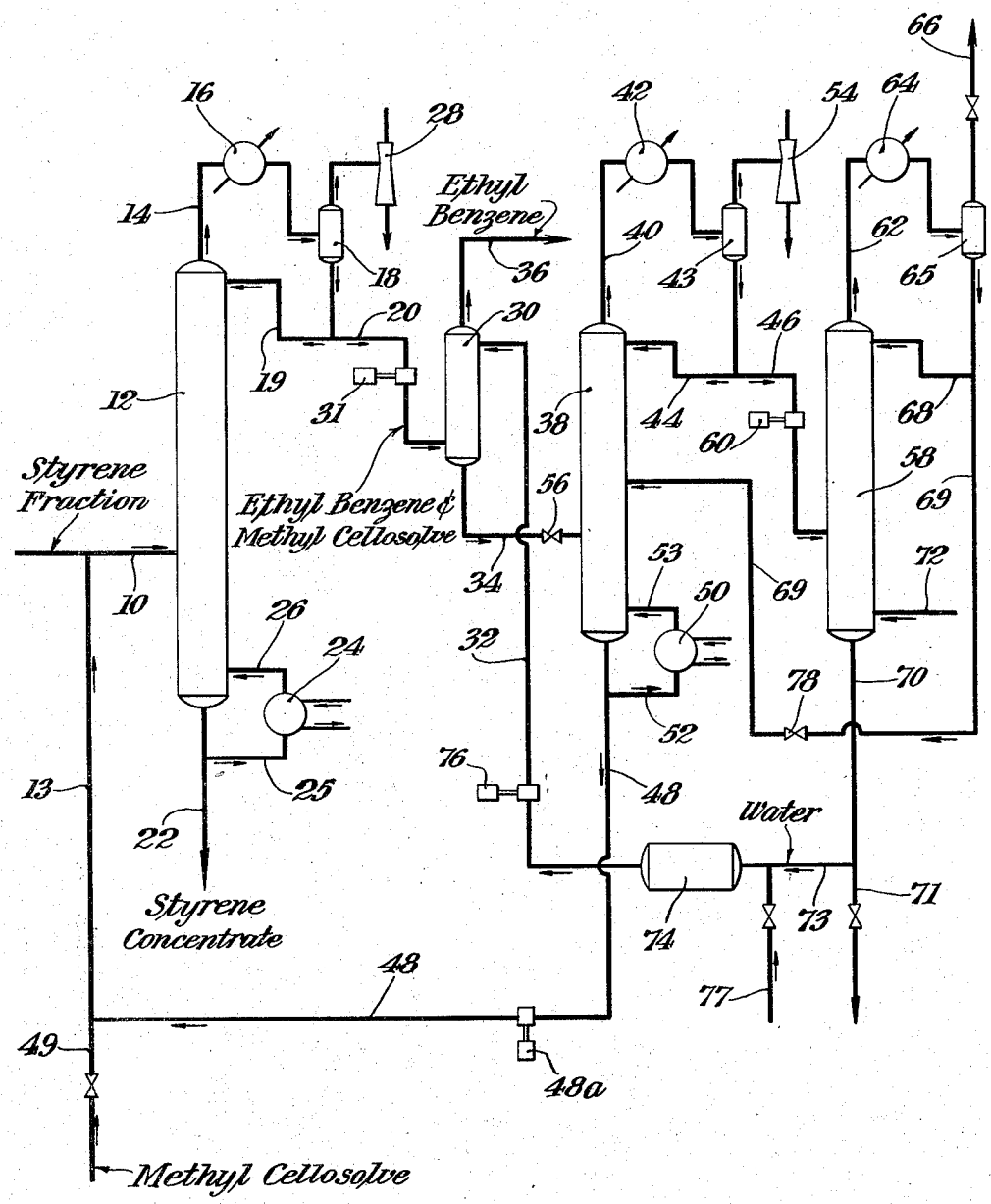
INVENTOR
*Ward J. Bloomer*
BY
ATTORNEY Patented Apr. 16, 1946

2,398,689

UNITED STATES PATENT OFFICE 2,398,689

AZEOTROPIC STYRENE DISTILLATION

Ward J. Bloomer, Westfield, N. J., assignor to The Lummus Company, New York, N. Y., a corporation of Delaware Application August 17, 1942, Serial No. 455,128

4 Claims. (Cl. 209—42)

This invention relates to azeotropic distillation and particularly to the recovery of the azeotrope-forming agent or entrainer used in such distillation. This application is a continuation-in-part of my prior copending application, S. N. 430,147, filed February 9, 1942.

In my prior application referred to above, I have disclosed a procedure for recovering concentrated styrene by means of azeotropic distillation of a styrene-containing mixture in the presence of particular entrainers whereby the hydrocarbons having boiling points close to that of styrene are separated as an overhead in the form of substantially a binary azeotrope with the entrainer. Such an entrainer is preferably soluble in the hydrocarbons which have been separated from the crude styrene fraction, and for economic reasons it is desirable to recover the entrainer from such solution for reuse. Washing or leaching of the entrainer from the hydrocarbon solution with a solvent that dissolves substantially only the entrainer has been proposed, and water is admirably suited for this purpose because of its abundance and cheapness. The use of water for such purpose has heretofore been considered disadvantageous, however, because of the formation of an azeotrope with the entrainer when the water is separated from most such entrainers, which situation has been considered to require a complex system for the recovery of the entrainer.

It is the primary object of my invention to provide an improved method for recovering the azeotrope-forming agent or entrainer used in the separation of a particular component from admixture with other close-boiling components by azeotropic distillation.

It is another object of my invention to provide an improved procedure for utilizing water in the recovery of the entrainer used to separate styrene or the like from admixture with like-boiling hydrocarbons by azeotropic distillation.

Further objects and advantages of my invention will be apparent from the following description thereof taken in connection with the attached drawing illustrative thereof.

In one embodiment of my invention, the mixture of like-boiling constituents containing the component to be separated therefrom in a more concentrated form may be conveniently introduced through line 10 into distillation tower 12. Such a mixture may comprise a fraction of primarily close-boiling aromatic hydrocarbons containing styrene in a relatively low concentration. This crude styrene mixture may comprise, for example, the product obtained by the dehydrogenation of ethyl benzene to styrene, or it may comprise a styrene-containing fraction obtained from the drip oil recovered in the manufacture of artificial gas or from the coal tar distillate produced in the coking of coal.

It will be appreciated that the composition of the dilute styrene fraction to be concentrated will depend on its source and on the prior treatment to which it has been subjected. A typical example of the product formed in the dehydrogenation of ethyl benzene to styrene may have the following composition:

|  | Wt. percentage | B. P., °F. |
| --- | --- | --- |
| Benzene | 7.3 | 176.2 |
| Toluene | 5.5 | 231.1 |
| Ethyl benzene | 62.2 | 277.2 |
| Styrene | 20.3 | 294.8 |
| Higher boiling components | 4.8 |  |

The composition of a typical styrene-containing fraction obtained from the light oil distillate produced in the coking of coal may be as follows:

|  | Wt. percentage | B. P., °F. |
| --- | --- | --- |
| Ethyl benzene | 2 | 277.2 |
| Paraxylene | 13 | 281.1 |
| Metaxylene | 35 | 282.7 |
| Orthoxylene | 5 | 288.9 |
| Styrene | 27 | 294.8 |
| Propyl benzenes | 10 | 307–316 |
| Trimethyl benzenes | 2 | 328 |
| Olefins | 5 | 356–401 |
| Paraffins | 2 | 356–401 |
| Higher boiling components | Less than 1 |  |

Since the styrene in such a fraction is admixed with other hydrocarbon materials of like boiling point, it is substantially impossible to recover the styrene in a highly concentrated condition by ordinary distillation methods. For example, the concentrated fraction obtained by subjecting a crude styrene fraction to ordinary distillation even under a relatively high vacuum contains approximately only 55% styrene by volume. This concentration limitation is also based to some extent on the distillation temperatures to which styrene can be subjected, for styrene tends to polymerize at an increased rate as the temperature is increased. Accordingly, azeotropic distillation is desirably resorted to for the separation of styrene from such a mixture as disclosed in my prior copending application, S. N. 430,147. Among the materials which I have found suitable for such purpose are the lower fatty acids, particularly acetic acid (boiling point, 244.8° F.), the normally liquid aliphatic alcohols such as butyl alcohol (boiling point, 243.9° F.), the ethylene glycol ethers, particularly "methyl cellosolve" (ethylene glycol monomethyl ether—boiling point, 255.7° F.), "cellosolve" (ethylene glycol monoethyl ether—boiling point, 275.8° F.), "butyl cellosolve" (ethylene glycol monobutyl ether—boiling point, 339.1° F.) "methyl carbitol" (diethylene glycol monomethyl ether—boiling point, 379.8° F.), "carbitol" (diethylene glycol monoethyl ether—boiling point, 395.4° F.) and "diethyl carbitol" (boiling point, 370.2° F.), esters of ethylene glycol ethers such as "methyl cellosolve acetate" (boiling point, 292.1° F.) and "cellosolve acetate" (boiling point, 307.4° F.), and other polar oxygen-containing organic compounds. I have had particular success in the use of the "cellosolves," especially "methyl cellosolve," for this purpose.

For convenience only, my invention will be described in connection with the azeotropic distillation of a crude styrene fraction in the presence of "methyl cellosolve" as the entrainer to obtain a highly concentrated styrene product wherein the crude styrene fraction has been obtained by the dehydrogenation of ethyl benzene.

The necessary amount of "methyl cellosolve" to effect the desired azeotropic separation is added through line 13 to the incoming crude styrene fraction. In tower 12 this crude styrene fraction is distilled in the presence of the "methyl cellosolve," which forms an azeotropic mixture with a major portion of the like-boiling hydrocarbons associated with the styrene. This azeotropic mixture is removed overhead through line 14 for condensation in condenser 16, the condensate from which is collected in accumulator 18. A portion of the resulting condensate is returned as reflux to tower 12 through line 19, and the remainder of this condensate is passed through line 20 for recovery of the "methyl cellosolve" as will be hereinafter more particularly described. The styrene concentrate is removed from tower 12 through bottoms line 22 and may be used as such or may be separated from the remaining primarily higher boiling hydrocarbons in any appropriate manner.

Heat is supplied to tower 12 by means of a reboiler 24, through which a portion of the bottoms from the tower is circulated as by means of lines 25 and 26. Tower 12 is desirably operated under a vacuum, for example, on the order of 100 mm. Hg absolute pressure, in order to prevent undue polymerization of the styrene because of heating and other side reactions; and the necessary vacuum may conveniently be produced by a jet ejector 28 or the like in communication with accumulator 18. The operating conditions are also desirably so maintained that substantially no styrene or, at the most, only a minimum amount of styrene appears in the overhead vapors from column 12.

In accordance with my invention, the azeotropic overhead condensate from tower 12 is introduced through line 20 into the extraction column 30 as by means of pump 31. In the treatment of the particular styrene fraction mentioned, this overhead condensate comprises an azeotropic mixture of "methyl cellosolve" and hydrocarbons consisting for the most part of ethyl benzene. This azeotropic mixture is subjected in column 30 to extraction or washing with a liquid which is substantially a solvent for the "methyl cellosolve" but substantially a non-solvent for the ethyl benzene or other hydrocarbons and in which the "methyl cellosolve" is preferentially more soluble than in the ethyl benzene. This extracting or washing liquid should also have a boiling point below the boiling point of the "methyl cellosolve" for effective operation of my invention. A suitable liquid for this purpose comprises water, which will dissolve the "methyl cellosolve" but not the ethyl benzene. Furthermore, "methyl cellosolve" is preferentially considerably more soluble in the water than in the hydrocarbons; and water boils at a materially lower temperature than "methyl cellosolve." The effect of this extraction in column 30 is to break up the binary azeotrope of "methyl cellosolve" and ethyl benzene so that the "methyl cellosolve" can be readily recovered for reuse as the entrainer in the azeotropic concentration of the crude styrene fraction and so that the ethyl benzene can be eliminated from the system.

The extraction in column 30 is desirably conducted under such conditions that substantially all the "methyl cellosolve" is dissolved by the water. Preferably, the extraction is accomplished in a continuous countercurrent manner as shown; and, accordingly, the necessary water is introduced through line 32 into the top of extraction column 30. The resulting aqueous solution of "methyl cellosolve" is removed from the bottom of column 30 through line 34; and the ethyl benzene, substantially free of "methyl cellosolve" and water, is removed from the top of column 30 through line 36. This ethyl benzene may be disposed of as desired and may be subjected to dehydrogenation for the further production of styrene.

Column 30 may be operated under any desired pressure but is desirably operated at atmospheric pressure for convenience. It will be appreciated that more than one column may be used to accomplish the desired extraction; if necessary or desirable, several or more columns or stages may be employed. Furthermore, the use of a counter current extraction column is not necessary for the satisfactory operation of my invention; for any suitable procedure for extracting or washing the "methyl cellosolve" out of the azeotropic mixture may be used. Although water has been suggested as the extracting medium, any other liquid meeting the requirements may be substituted therefor.

According to my invention, the aqueous solution of "methyl cellosolve" is passed through line 34 into tower 38, wherein a separation is effected between "methyl cellosolve" and the binary azeotrope of "methyl cellosolve" with water. This "methyl cellosolve"-water azeotrope is removed overhead from tower 38 through line 40 for condensation in condenser 42. The resulting condensate is collected in accumulator 43, from which a portion thereof is returned to tower 38 through line 44 as reflux. The remainder of this azeotropic condensate is removed through line 46.

Desirably, the operating conditions in tower 38 are so maintained that substantially all the water is removed in the overhead azeotrope. Accordingly, "methyl cellosolve" free of water is withdrawn from tower 38 through bottoms line 48 and is preferably recirculated through line 13 as by means of pump 48a for admixture with the incoming crude styrene fraction. Provision may be made for the introduction through line 49 of additional "methyl cellosolve" to make up for any losses occurring in the system. Heat may be supplied to tower 38 as by means of reboiler 50, through which a portion of the bottoms stream is circulated as by means of lines 52 and 53.

In accordance with my invention, tower 38 is desirably operated under a vacuum since a considerable reduction in the absolute pressure of distillation permits the greater portion of the incoming "methyl cellosolve" to be removed water-free through the bottoms line 48. This result is obtained because, upon a reduction in absolute pressure, the percentage of water in the azeotrope of "methyl cellosolve" and water increases. Any desired degree of vacuum may be used, and the absolute pressure in tower 38 may or may not be the same as that in tower 12. The necessary vacuum may be produced by a jet ejector 54 or the like in communication with accumulator 43. In addition, valve 56 is provided in line 34 so that the desired vacuum in tower 38 may be continuously maintained and so that the feed rate to tower 38 may be suitably controlled.

The "methyl cellosolve"-water azeotrope condensate in line 46 still contains sufficient "methyl cellosolve" to warrant its recovery. Accordingly, this condensate is introduced into tower 58 through line 46 as by means of pump 60. In this tower a separation is effected between water and the binary azeotrope of water with "methyl cellosolve." This azeotrope is removed from tower 38 through overhead line 62 for condensation in condenser 64. The resulting condensate is collected in accumulator 65, which is desirably provided with the valved vent line 66. A portion of this condensate is returned through line 68 to tower 58 as reflux. The remainder of the condensate is passed through line 69 to tower 38 for recovery of the "methyl cellosolve" remaining therein. This recycled condensate is desirably introduced into tower 38 at a point in accordance with its composition.

Operating conditions in tower 58 are preferably such that substantially all the "methyl cellosolve" is removed in the overhead azeotrope so that as complete a recovery of the "methyl cellosolve" as possible is accomplished. Hence, water free of "methyl cellosolve" is removed through bottoms line 70 for disposal as desired as through outlet line 71. To supply the necessary heat to effect the stripping of the "methyl cellosolve" from the water, live steam is injected into the bottom of tower 58 as through line 72. Where it is preferable to so regulate conditions within tower 58 that a relatively small percentage of "methyl cellosolve" remains in the aqueous bottoms as for reasons of heat economy or the like, this bottoms stream is passed through line 73 to accumulator 74, from which the water is returned to the top of extraction column 30 through line 32 as by means of pump 76. In such case, a portion of this aqueous bottoms substantially equivalent to the amount of live steam introduced through line 72 must be removed through line 71. Fresh or make-up water may be introduced through line 77 as necessary.

The absolute pressure in tower 58 is higher than that maintained in tower 38. In this way, the greater portion of the water is rejected through bottoms line 70 since, with an increase in absolute pressure, the percentage of "methyl cellosolve" in the "methyl cellosolve"-water azeotrope increases. Any desired absolute pressure may be maintained on tower 58, and atmospheric pressure may be used if most convenient. Valve 78 is provided in return line 69 so that the necessary vacuum in tower 38 may be continuously maintained and so that the return of the condensate through line 69 to tower 38 may be suitably controlled.

By means of this procedure, I am enabled to economically use water in the recovery of the entrainer utilized in the azeotropic distillation and concentration of crude styrene. Water-washing or extraction or leaching of the entrainer from its solution with the close-boiling hydrocarbons can now be employed without the requirement of a highly complex system for the separation of the entrainer from its solution with the water. The entrainer is recovered substantially free of water and the close-boiling hydrocarbons and is continuously returned in a closed cycle for reuse in the styrene distillation. Likewise, the water for extracting the entrainer may be substantially completely recovered and continuously circulated in a closed cycle for further extraction.

The following application of my invention will illustrate its operation. A crude styrene fraction obtained by the dehydrogenation of ethyl benzene is admixed with "methyl cellosolve" and is subjected to azeotropic distillation in column 12 in accordance with the disclosure of my copending application, S. N. 430,147, to produce a styrene concentrate which is removed through bottoms line 22. An absolute pressure of about 62 mm. Hg is maintained at the top of tower 12, and a binary azeotropic overhead condensate containing approximately 59.6% ethyl benzene and 40.4% "methyl cellosolve" by volume is obtained. The temperature of the overhead binary vapors at this pressure is approximately 120° F. This condensate is passed to the extraction column 30, wherein the "methyl cellosolve" is washed out by countercurrent contact of the condensate with water. The separated ethyl benzene is removed through line 36 for use as desired. The minimum volume of water necessary to effectively wash out all the "methyl cellosolve" is substantially one-half of the volume of the azeotropic condensate. The operation in column 30 may be conveniently conducted at atmospheric pressure. With the use of the minimum amount of washing water, the resulting aqueous "methyl cellosolve" comprises 44.7% "methyl cellosolve" and 55.3% water by volume. This solution of "methyl cellosolve" is then passed to the binary azeotropic distillation tower 38, wherein it is distilled under about 100 mm. Hg absolute pressure. A bottoms stream comprising substantially water-free "methyl cellosolve" is produced and is recycled to tower 12 for reuse therein. On the basis of 100 gallons of charge per hour to tower 38, 44.7 gallons of "methyl cellosolve" per hour are removed through line 48. The binary azeotropic overhead from tower 38 contains about 4.2% "methyl cellosolve" and 95.8% water by volume or 2.8 gallons of "methyl cellosolve" and 64.8 gallons of water per hour. At this pressure the temperature of these binary overhead vapors is approximately 124.4° F. This binary overhead is condensed, and the resulting condensate is introduced into the binary azeotropic distillation tower 58, which is conveniently operated at atmospheric pressure. The binary azeotropic overhead from tower 58 contains about 22.7% "methyl cellosolve" and 77.3% water by volume or 2.8 gallons of "methyl cellosolve" and 9.5 gallons of water per hour. The temperature of these binary vapors at atmospheric pressure is approximately 211.8° F. This latter binary overhead is condensed, and the condensate is returned to vacuum tower 38 for ultimate recovery of the "methyl cellosolve." Substantially "methyl cellosolve"-free water is removed through bottoms line 70 at the rate of 55.3 gallons per hour and may either be eliminated through line 71 or recycled to extraction column 30. The latter procedure is preferred whenever any small amount of "methyl cellosolve" remains in the aqueous bottoms for any reason. Despite the face that the boiling points of the "methyl cellosolve"-water azeotrope and of water are so close at atmospheric pressure, an effective separation can be made with a relatively small number of decks. The precise reason for this result is not yet known, but it appears that the azeotropic distillation itself is the principal cause.

In the application of my invention to the separation of a styrene-containing fraction derived from the light oil distillate obtained in the coking of coal, the separation in column 12 is primarily between the xylenes and styrene. With "methyl cellosolve" as the entrainer, the overhead vapors from column 12 comprise substantially a binary azeotrope of xylenes and "methyl cellosolve." Other primarily aromatic hydrocarbons such as ethyl benzene and the propyl benzenes are admixed with the xylenes; but the xylenes comprise the greater portion of the hydrocarbons in this binary azeotrope. The overhead condensate from tower 12 is then extracted with water in column 30 for the separation of the "methyl cellosolve" from the xylenes, which are removed through line 36. The resulting aqueous solution of "methyl cellosolve" may then be treated in the same manner as the aqueous "methyl cellosolve" obtained in the above example.

The recovery of entrainers used in the azeotropic concentration of other polymerizable vinyl aromatic compounds is also within the scope of my invention. Such compounds include methyl styrene, chlorinated derivatives of styrene, and the like.

The application of my invention is not limited to the particular examples described herein. It is applicable to the recovery of the entrainer used in the azeotropic concentration of a particular component from any mixture of close-boiling components in which such entrainer is soluble. In the recovery of this entrainer by means of my improved procedure, the washing, extracting, or leaching agent (water) used for this purpose should be insoluble or substantially insoluble in the components of the initial mixture undergoing concentration so that the desired separation of the entrainer is assured. In addition, the washing agent should be soluble or substantially soluble in the entrainer; and the entrainer should be preferentially more soluble in the washing agent than in the components of the initial mixture. Furthermore, for the proper application of my invention, the washing agent should form a binary azeotrope with the entrainer and should have a lower boiling point than the entrainer. The nature of the azeotrope should also be such that, as the absolute pressure of distillation is increased, the percentage of entrainer in the azeotrope increases.

It will also be apparent that my invention is applicable to the breaking up of a binary azeotrope whose components have the above characteristics.

My invention is also not limited to the use of a vacuum in tower 12 and to the use of a vacuum in tower 38 and of atmospheric pressure in tower 58. Any suitable pressure may be used in tower 12, and any suitable pressures may be used in towers 38 and 58. In the operation of the latter two towers, however, the pressures in each should be different, and the pressure in tower 58 should be sufficiently greater than that in tower 38 so that a noticeable shift in the composition of the entrainer-washing agent binary takes place. For example, when the azeotropic distillation is carried out in tower 58 under 9.8 lbs./sq. in. gauge pressure (1266 mm. Hg absolute pressure), the overhead binary azeotrope comprises 28.1% "methyl cellosolve" and 71.9% water by volume and is removed at a temperature of 238° F. The particular pressure employed in tower 58 is governed primarily by the greater advantage to be gained in operating at such pressure.

Although I have described a preferred procedure for carrying out my invention, it will be apparent that modifications may be made thereto. Accordingly, only such limitations as appear in the claims appended hereinafter should be applied.

I claim:

1. In the method of separating styrene from a mixture thereof with close-boiling aromatic hydrocarbons selected from the group consisting of ethyl benzene and the xylenes wherein such mixture is subjected to a binary azeotropic distillation in the presence of an entrainer comprising an ethylene glycol lower alkyl ether and a styrene concentrate is removed as the bottoms stream from such binary distillation and a binary azeotrope comprising the aromatic hydrocarbons and the ethylene glycol lower alkyl ether is removed as the overhead therefrom, the method of recovering the ethylene glycol lower alkyl ether from such binary azeotropic overhead, which comprises washing the ethylene glycol lower alkyl ether from this binary azeotrope with water, removing the aromatic hydrocarbons substantially free of the ethylene glycol lower alkyl ether from the system, subjecting the aqueous solution of the ethylene glycol lower alkyl ether to a second binary azeotropic distillation, removing the ethylene glycol lower alkyl ether substantially free of water as the bottoms stream from this second binary distillation, recycling this separated ethylene glycol lower alkyl ether to the first binary distillation for reuse therein, removing a binary azeotrope comprising the water and ethylene glycol lower alkyl ether as the overhead from this second binary distillation, subjecting this latter overhead to a third binary azeotropic distillation, removing a binary azeotrope comprising the ethylene glycol lower alkyl ether and water as the overhead from this third binary distillation, returning this third azeotrope to the second binary distillation for ultimate separation of the ethylene glycol lower alkyl ether from the water, maintaining the pressure on the third binary distillation higher than that maintained on the second binary distillation whereby the percentage of ethylene glycol lower alkyl ether in the third binary azeotrope is greater than that in the second binary azeotrope, and removing water substantially free of ethylene glycol lower alkyl ether as the bottoms stream from the third binary distillation.

2. The method as claimed in claim 1, in which the ethylene glycol lower alkyl ether comprises ethylene glycol monomethyl ether.

3. The method as claimed in claim 1, which includes conducting the second binary azeotropic distillation at a subatmospheric pressure and conducting the third binary azeotropic distillation at a pressure ranging from atmospheric to superatmospheric.

4. The method as claimed in claim 1, which includes recycling the aqueous bottoms from the third binary distillation to the washing step for reuse therein.

WARD J. BLOOMER.